United States Patent
Miwa et al.

(10) Patent No.: US 8,565,956 B2
(45) Date of Patent: Oct. 22, 2013

(54) CRANKING TORQUE CONTROL APPARATUS

(75) Inventors: Koji Miwa, Susono (JP); Takashi Kawai, Gotemba (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/390,629

(22) PCT Filed: May 18, 2011

(86) PCT No.: PCT/JP2011/061409
§ 371 (c)(1),
(2), (4) Date: Feb. 15, 2012

(87) PCT Pub. No.: WO2012/157089
PCT Pub. Date: Nov. 22, 2012

(65) Prior Publication Data
US 2012/0296503 A1    Nov. 22, 2012

(51) Int. Cl.
*B60L 11/00* (2006.01)
(52) U.S. Cl.
USPC .......... 701/22; 180/65.29; 903/903
(58) Field of Classification Search
USPC ............. 701/22; 477/3; 180/65.285, 65.29; 903/903, 930; 123/179.3
See application file for complete search history.

(56) References Cited

U.S. PATENT DOCUMENTS

| 6,247,437 B1 * | 6/2001 | Yamaguchi et al. ....... 123/179.3 |
| 6,742,487 B2 * | 6/2004 | Yamaguchi et al. ....... 123/179.3 |
| 7,032,581 B2 * | 4/2006 | Gibson et al. ................ 123/673 |
| 7,292,917 B2 * | 11/2007 | Kuang et al. .................... 701/22 |
| 7,722,498 B2 * | 5/2010 | Kawasaki et al. ................ 477/3 |
| 7,726,270 B2 * | 6/2010 | Miwa et al. ................ 123/179.3 |
| 7,766,788 B2 | 8/2010 | Shamoto |
| 2009/0163317 A1 | 6/2009 | Goda et al. |
| 2010/0051361 A1 | 3/2010 | Katsuta et al. |
| 2012/0095635 A1 * | 4/2012 | Kanno et al. .................... 701/22 |
| 2013/0017926 A1 * | 1/2013 | Miwa et al. ....................... 477/3 |

FOREIGN PATENT DOCUMENTS

| JP | 2001-057704 A | 2/2001 |
| JP | 2006-094691 A | 4/2006 |
| JP | 2006-183522 A | 7/2006 |
| JP | 2009-166513 A | 7/2009 |

(Continued)

OTHER PUBLICATIONS

International Search Report of PCT/JP2011/061409, dated Aug. 23, 2011.

(Continued)

*Primary Examiner* — Russell Frejd
(74) *Attorney, Agent, or Firm* — Sughrue Mion, PLLC

(57) ABSTRACT

A cranking torque control apparatus (100) is mounted on a hybrid vehicle provided with: an engine (11), a motor (MG1) coupled with the engine and capable of cranking the engine, and a battery (21) capable of supplying an electric power to the motor. The cranking torque control apparatus is provided with: a setting device (22) capable of setting an output limit value which is a limit value for the electric power outputted from the battery in accordance with an electric power deviation when the motor cranks the engine; and a controlling device (22) for controlling said setting device not to set the output limit value under a condition that a voltage of the battery falls below a lower limit voltage associated with the battery due to resonance of the engine or due to a first fire of the engine.

2 Claims, 4 Drawing Sheets

(56) References Cited

FOREIGN PATENT DOCUMENTS

| | | |
|---|---|---|
| JP | 2009-190525 A | 8/2009 |
| JP | 2009-292179 A | 12/2009 |
| JP | 2011-051480 A | 3/2011 |

OTHER PUBLICATIONS

U.S. Office Action dated Jun. 21, 2013 issued in related U.S. Appl. No. 13/520,309.

* cited by examiner

CRANKING TORQUE CONTROL APPARATUS

TECHNICAL FIELD

The present invention relates to a cranking torque control apparatus for controlling a cranking torque of a motor when an engine is cranked by the motor in a vehicle provided with the engine and the motor, such as a hybrid car.

BACKGROUND ART

As this type of apparatus, for example, there has been suggested an apparatus for performing a smoothing process on an electric power deviation, calculated by subtracting an assumed electric power to be inputted to or outputted from the motor from an input/output electric power to be inputted to or outputted from a battery, and for setting an input/output allowable limit on the basis of the electric power deviation and an input/output limit of the battery, in order to suppress charge and discharge by an excess electric power of the battery (refer to a patent document 1).

Alternatively, there has been suggested an apparatus for driving a motor generator to crank the engine when receiving a change request from an electric vehicle (EV) driving mode to a hybrid vehicle (HV) driving mode. Here, in particular, the following is described; namely, a discharge allowable electric power is derived such that a direct current voltage of the battery does not fall below a lower limit voltage and a torque command value is adjusted such that a consumption power of the motor generator does not exceed the discharge allowable electric power. Moreover, it is also described that the lower limit voltage is temporarily increased if an accelerator opening degree reaches a predetermined reference value within a predetermined time after the request to change to the HV driving mode (refer to a patent document 2).

PRIOR ART DOCUMENT

Patent Document

Patent document 1: Japanese Patent Application Laid Open No. 2006-094691
Patent document 2: Japanese Patent Application Laid Open No. 2009-166513

DISCLOSURE OF INVENTION

Subject to be Solved by the Invention

In the aforementioned background art, if a state of charge of the battery falls below a lower limit value in a case where a battery remaining amount is relatively low or in a case where an engine temperature is relatively low or in similar cases, protection of the battery is prioritized, resulting in an unexpected engine stall, which is technically problematic.

In view of the aforementioned problem, it is therefore an object of the present invention to provide a cranking torque control apparatus capable of suppressing the occurrence of the unexpected engine stall caused by that the voltage of the battery falls below the lower limit voltage of the battery.

Means for Solving the Subject

The above object of the present invention can be achieved by a first cranking torque control apparatus mounted on a hybrid vehicle provided with: an engine, a motor coupled with the engine and capable of cranking the engine, and a battery capable of supplying an electric power to the motor, the cranking torque control apparatus provided with: a setting device capable of setting an output limit value which is a limit value for the electric power outputted from the battery in accordance with an electric power deviation when the motor cranks the engine; and a controlling device for controlling the setting device not to set the output limit value under a condition that a voltage of the battery falls below a lower limit voltage associated with the battery due to resonance of the engine.

According to the first cranking torque control apparatus of the present invention, the cranking torque control apparatus is mounted on a hybrid vehicle provided with: an engine, a motor coupled with the engine and capable of cranking the engine, and a battery capable of supplying an electric power to the motor. Here, the "motor" means a motor for controlling the engine but may mean a motor realized in a motor generator. In other words, as long as the it can function as a motor, "motor" may mean a motor generator.

The setting device, which is provided with, for example, a memory, a processor, and the like, can set an output limit value which is a limit value for the electric power outputted from the battery in accordance with an electric power deviation when the motor cranks the engine (i.e. at the start of the engine).

Here, the "electric power deviation" means a deviation between a target input/output electric power and an actual input/output electric power. Incidentally, since various known aspects can be applied to a method of setting the output limit value in accordance with the electric power deviation, the details thereof will be omitted in order to prevent a complicated explanation.

The controlling device, which is provided with, for example, a memory, a processor, and the like, controls the setting device not to set the output limit value under a condition that a voltage of the battery falls below a lower limit voltage associated with the battery due to resonance of the engine. Here, the "resonance of the engine" means a relatively large variation in the number of revolutions of the engine, which occurs when the number of revolutions of the engine passes through a resonance band of a power transmission system including the engine.

Incidentally, since various known aspects can be applied to a method of setting the "lower limit voltage associated with the battery", the details thereof will be omitted in order to prevent a complicated explanation.

According to a study by the present inventors, the following matter has been found; namely, if the voltage of the battery falls below the lower limit voltage set in advance for a relatively long time, it likely causes rapid deterioration of the battery. Thus, in many cases, the electric power outputted from the battery is limited so that the voltage of the battery does not fall below the lower limit voltage. Then, due to the limited output electric power of the battery, a cranking torque of the motor is reduced. As a result, the number of revolutions of the engine decreases with decreasing support torque, thereby likely leading to an unexpected engine stall.

Thus, in the present invention, by allowing that the voltage of the battery temporarily falls below the lower limit voltage, the occurrence of the unexpected engine stall is suppressed. Specifically, as described above, the setting device is controlled by the controlling device not to set the output limit value under the condition that the voltage of the battery falls below the lower limit voltage due to the resonance of the engine.

In other words, if the output limit value is set in accordance with the electric power deviation, the electric power deviation detected a predetermined time before is used. Thus, if the voltage of the battery momentarily falls below the lower limit voltage, for example, due to the resonance of the engine or the like the predetermined time before, then, the electric power outputted from the battery is limited more than is necessary in many cases. Thus, in the present invention, if it is predicted that the voltage of the battery momentarily falls below the lower limit voltage, the output limit value is not set. By this, it is prevented that the electric power outputted from the battery is limited more than is necessary.

As a result, it is possible to suppress the reduction in the cranking torque of the motor, and it is also possible to suppress the occurrence of the unexpected engine stall. On the other hand, if it is predicted that the voltage of the battery falls below the lower limit voltage for a relatively long time, it is possible to suppress the deterioration of the battery by performing such a control that the battery is preferentially protected.

Incidentally, since the resonance band depends on a structure of the power transmission system of the hybrid vehicle, the resonance band can be predicted in a design stage, which has been found from the study by the present inventors. Therefore, whether or not it is caused by the resonance of the engine that the voltage of the battery falls below the lower limit value can be relatively easily judged from the number of revolutions of the engine or the like.

The above object of the present invention can be also achieved by a second cranking torque control apparatus mounted on a hybrid vehicle provided with: an engine, a motor coupled with the engine and capable of cranking the engine, and a battery capable of supplying an electric power to the motor, the cranking torque control apparatus provided with: a setting device capable of setting an output limit value which is a limit value for the electric power outputted from the battery in accordance with an electric power deviation when the motor cranks the engine; and a controlling device for controlling the setting device not to set the output limit value under a condition that a voltage of the battery falls below a lower limit voltage associated with the battery due to a first fire of the engine.

According to the second cranking torque control apparatus of the present invention, as in the first cranking torque control apparatus of the present invention described above, it is possible to suppress the reduction in the cranking torque of the motor, and it is also possible to suppress the occurrence of the unexpected engine stall.

The controlling device, which is provided with, for example, a memory, a processor, and the like, controls the setting device not to set the output limit value under a condition that a voltage of the battery falls below a lower limit voltage associated with the battery due to a first fire of the engine.

Here, according to the study by the present inventors, the following matter has been found; namely, if there is the first fire at the start of the engine, the number of revolutions of the motor also increases with increasing number of revolutions of the engine. Then, power consumption of the motor becomes greater than expected, and the voltage of the battery likely falls below the lower limit voltage set in advance. Thus, if the output limit value is set in accordance with the electric power deviation, the electric power outputted from the battery is likely limited more than is necessary, and this likely causes the unexpected engine stall.

Thus, in the present invention, as described above, the setting device is controlled by the controlling device not to set the output limit value under the condition that the voltage of the battery falls below the lower limit voltage associated with the battery due to the first fire of the engine. In other words, in the present invention, by allowing that the voltage of the battery temporarily falls below the lower limit voltage, the occurrence of the unexpected engine stall is suppressed.

Incidentally, since various known aspects can be applied to a method of judging whether or not the engine has the first fire (i.e. first fire judgment), the details thereof will be omitted in order to prevent a complicated explanation.

The operation and other advantages of the present invention will become more apparent from Mode for Carrying Out the Invention explained below.

MODE FOR CARRYING OUT THE INVENTION

Hereinafter, embodiments of the cranking torque control apparatus of the present invention will be explained with reference to the drawings.

First Embodiment

Configuration of Vehicle

Figure 1:
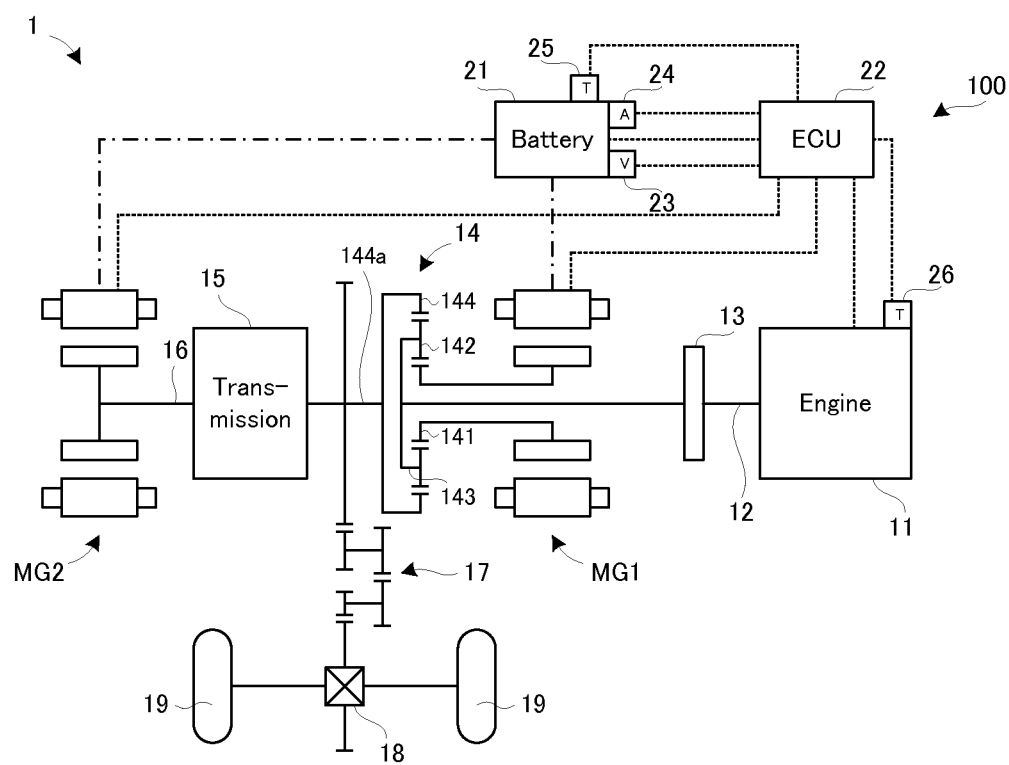
FIG. 1 is a schematic diagram showing a configuration of a hybrid vehicle in a first embodiment.

A configuration of a hybrid vehicle in a first embodiment will be explained with reference to FIG. 1. FIG. 1 is a schematic diagram showing the configuration of the hybrid vehicle in the embodiment. Incidentally, FIG. 1 shows only members directly related to the present invention, and other members are omitted as occasion demands.

In FIG. 1, a hybrid vehicle 1 is provided with: an engine 11; a triaxial power distributing mechanism 14 connected via a damper 13 to a crankshaft 12 as an output shaft of the engine 11; a motor generator MG1, connected to the power distributing mechanism 14, capable of generating electricity; a motor generator MG2 connected to the power distributing mechanism 14 via a transmission 15; a battery 21 capable of supplying an electric power to each of the motor generators MG1 and MG2 and capable of being charged by a regenerative electric power of each of the motor generators MG1 and MG2; and an electronic control unit (ECU) 22.

The engine 11 is an internal combustion engine for outputting power by using fuel such as gasoline. The engine 11 is subject to operation control, such as fuel injection control, ignition control, and intake air adjustment control, by the ECU 22.

The power distributing mechanism 14 is provided with: a sun gear 141; a ring gear 144 disposed concentrically around the sun gear 141; a plurality of pinion gears 142 engaging with the sun gear 141 and engaging with the ring gear 144; and a carrier 143 for holding the plurality of pinion gears 142 so that the plurality of pinion gears 142 can rotate on their own axes and revolve around the carrier 143. In other words, the power distributing mechanism 14 is configured as a planetary gear mechanism for performing a differential action, with the sung gear 141, the ring gear 144, and the carrier 143 as rotational elements.

To the sun gear 141, the motor generator MG1 is connected. To the carrier 143, the crankshaft 12 of the engine 11 is connected via the damper 13. To the ring gear 144, the transmission 15 is connected via a ring gear shaft 144a.

When the motor generator MG1 functions as a generator, the power distributing mechanism 14 distributes the power from the engine 11 inputted via the carrier 143, to the sun gear 141 side and the ring gear 144 side, in accordance with its gear ratio.

On the other hand, when the motor generator MG1 functions as a motor, the power distributing mechanism 14 integrates the power from the engine 11 inputted via the carrier 143 and power from the motor generator MG1 inputted via the sun gear 141, and outputs the integrated power to the ring gear 144 side. The power outputted to the ring gear 144 is outputted from the ring gear shaft 144a via a differential gear 18 and a gear mechanism 17 to drive wheels 19.

Moreover, when the motor generator MG1 functions as the motor and when the crankshaft 12 of the engine 11 is cranked by the motor generator MG1, the power from the motor generator MG1 inputted via the sun gear 141 is transmitted to the crankshaft 12 via the carrier 143.

The transmission 15 is configured to make a connection of a rotating shaft 16 of the motor generator MG2 with the ring gear shaft 144a and to release the connection.

Incidentally, the "motor generator MG1" in the embodiment is one example of the "motor" of the present invention.

(Cranking Torque Control Apparatus)

A cranking torque control apparatus 100 mounted on the hybrid vehicle 1 as configured above is provided with the ECU 22 which can set an output limit value as a limit value for the electric power outputted from the battery 21 in accordance with an electric power deviation when the motor generator MG1 cranks the engine 11 and which stops the setting of the output limit value under the condition that the voltage of the battery 21 falls below a lower limit voltage associated with the battery 21 due to resonance of the engine 11.

The cranking torque control apparatus 100 is further provided with: a voltage sensor 23 for detecting an inter-terminal voltage of the battery 21; a current sensor 24 for detecting an electric current inputted to or outputted from the battery 21; a temperature sensor 25 for detecting a temperature of the battery 21; and a temperature sensor 26 for detecting a temperature of the engine 11.

The "ECU 22" in the embodiment is one example of the "setting device" and the "controlling device" of the present invention. In other words, in the embodiment, one portion of the functions of the ECU 22 for various electronic control of the hybrid vehicle 1 is used as one portion of the cranking torque control apparatus 100.

(Cranking Torque Control Process)

A cranking torque control process performed by the cranking torque control apparatus 100 when the engine 11 is started (e.g. when the driving mode is changed to the HV driving mode from the EV driving mode) will be explained with reference to a flowchart in FIG. 2. The cranking torque control process is repeatedly performed at intervals of predetermined time (e.g. at intervals of several msec (milliseconds)), when the engine 11 is started.

Figure 2:
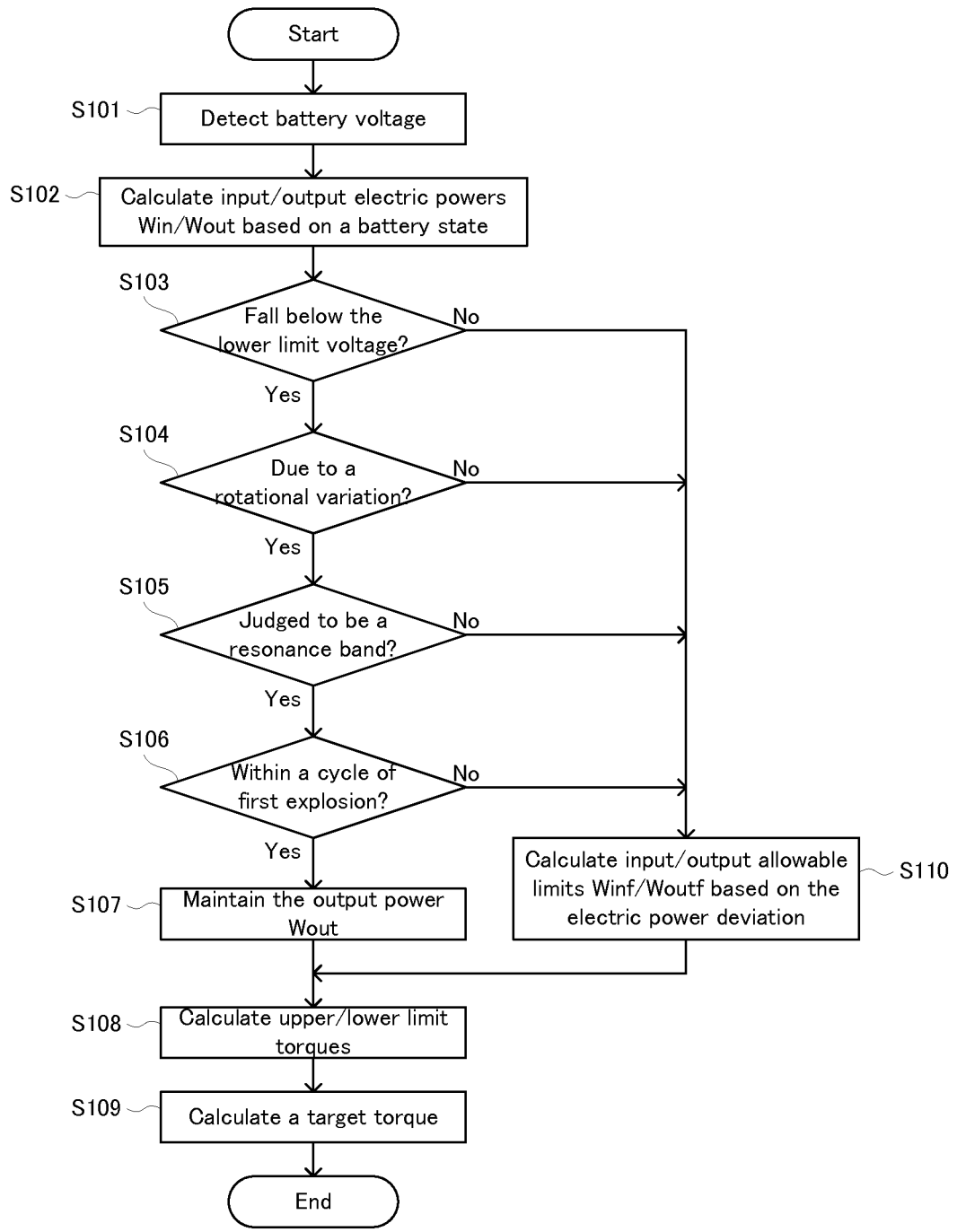
FIG. 2 is a flowchart showing a cranking torque control process in the first embodiment.

In FIG. 2, firstly, the ECU 22 as one portion of the cranking torque control apparatus 100 obtains the inter-terminal voltage of the battery 21 detected by the voltage sensor 23 (step S101).

Then, the ECU 22 calculates input/output electric powers Win, Wout on the basis of a state of the battery 21 (step S102). Specifically, for example, the ECU 22 calculates the input/output electric powers Win, Wout on the basis of a state of charge (SOC) of the battery 21 specified by the obtained inter-terminal voltage of the battery 21, the temperature of the battery 21 detected by the temperature sensor 25, or the like. Incidentally, the SOC of the battery 21 may be specified by integrating values of the electric current detected by the current sensor 24.

Then, the ECU 22 judges whether or not the inter-terminal voltage of the battery 21 detected by the voltage sensor 23 is less than the lower limit voltage associated with the battery 21 (step S103). If it is judged that the inter-terminal voltage of the battery 21 is greater than or equal to the lower limit voltage (the step S103: No), the ECU 22 calculates input/output allowable limits Winf, Woutf on the basis of the electric power deviation (step S110). Incidentally, since various known aspects can be applied to a method of calculating the input/output allowable limits Winf, Woutf, the details thereof will be omitted in order to prevent a complicated explanation.

Then, the ECU 22 calculates an upper limit output torque and a lower limit output torque on the basis of the calculated input/output allowable limits Winf, Woutf (step S108) and calculates a target torque within the limits of the upper limit output torque and the lower limit output torque (step S109).

In the process in the step S103, if it is judged that the inter-voltage of the battery 21 is less than the lower limit voltage (the step S103: Yes), the ECU 22 judges whether or not the fall below the lower limit voltage of the battery 21 is a temporal fall below the lower limit voltage due to the resonance of the engine 11. Specifically, the ECU 22 performs the following judgment processes in steps S104 to S106. Incidentally, the processes in the steps S104 to S106 may be performed not only in the order described in FIG. 2 but also starting from any process.

The ECU 22 judges whether or not the fall below the lower limit voltage of the battery 21 is due to a variation in the number of revolutions of the engine 11 (step S104). Specifically, for example, the ECU 22 judges whether or not the fall below the lower limit voltage of the battery 21 is due to the variation in the number of revolutions of the engine 11 on the basis of a change in the number of revolutions of the engine 11 within a predetermined period around a time point at which it is judged that the inter-terminal voltage of the battery 21 is less than the lower limit voltage.

If it is judged that the fall below the lower limit voltage of the battery 21 is due to the variation in the number of revolutions of the engine 11 (the step S104: Yes), the ECU 22 judges whether or not the number of revolutions of the engine 11 corresponds to a resonance band (step S105). If it is judged that the number of revolutions of the engine 11 corresponds to the resonance band (the step S105: Yes), the ECU 22 judges whether or not the fall below the lower limit voltage of the battery 21 is intermittent and whether or not a cycle of the variation in the number of revolutions of the engine 11 corresponds with a cycle of a primary component of explosion of the engine 11 (step S106).

If it is judged that the fall below the lower limit voltage of the battery 21 is intermittent and that the cycle of the variation in the number of revolutions of the engine 11 corresponds with the cycle of the primary component of explosion of the engine 11 (i.e. if results of the judgment processes in the step S104 to the step S106 described above are all "Yes") (the step S106: Yes), the ECU 22 judges that the fall below the lower limit voltage of the battery 21 is the temporal fall below the lower limit voltage due to the resonance of the engine 11.

Then, the ECU 22 maintains the output electric power Wout calculated in the process in the step 102 described above without calculating the input/output allowable limits Winf, Woutf based on the electric power deviation (i.e. without performing the process in the step S110 described above) (step S107).

Then, the ECU 22 calculates the upper limit output torque and the lower limit output torque on the basis of the input/output electric powers Win, Wout (the step S108) and calculates the target torque (the step S109).

If any of the results of the judgment processes in the step S104 to the step S106 described above is "No" (i.e. it is judged (i) that the fall below the lower limit voltage of the battery 21 is not due to the variation in the number of revolutions of the engine 11, (ii) that the number of revolutions of the engine 11 does not correspond to the resonance band, or (iii) that the fall below the lower limit voltage of the battery 21 is not intermittent or that the cycle of the variation in the number of revolutions of the engine 11 does not correspond with the cycle of the primary component of explosion of the engine 11), the ECU 22 judges that the fall below the lower limit voltage of the battery 21 is not temporal. Then, the ECU 22 performs the process in the step S110 described above, from the viewpoint of protection of the battery 21.

Second Embodiment

A cranking torque control apparatus in a second embodiment of the present invention will be explained with reference to FIG. 3 and FIG. 4. A configuration in the second embodiment is the same as that of the first embodiment, expect that a cranking torque control process to be performed is partially different. Thus, in the second embodiment, an explanation overlapping that of the first embodiment will be omitted, and common points in the drawings will carry the same reference numerals. Basically, only different points will be explained with reference to FIG. 3 and FIG. 4.

(Cranking Torque Control Process)

A cranking torque control process performed by the cranking torque control apparatus 100 in the embodiment will be explained with reference to a flowchart in FIG. 3.

Figure 3:
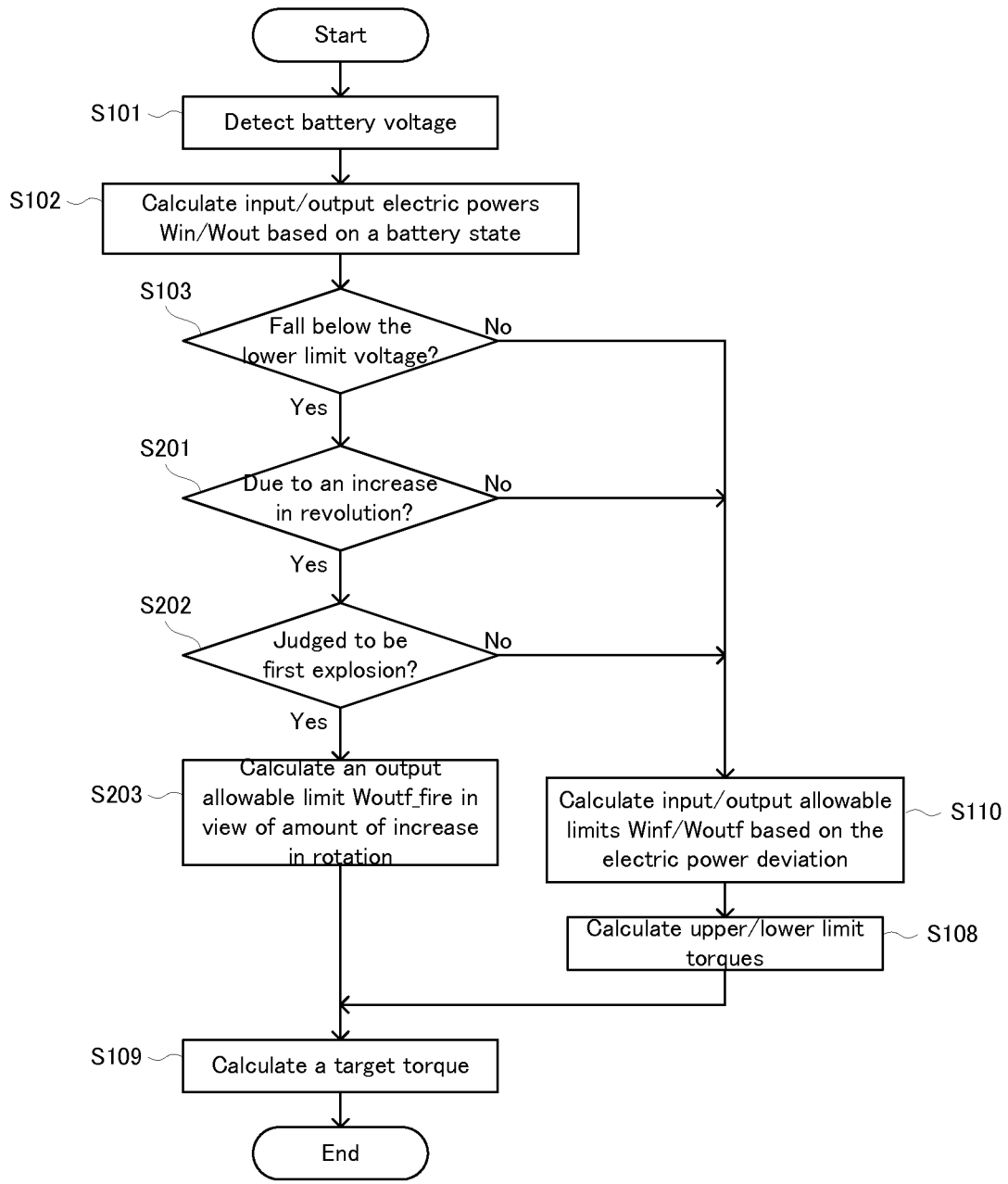
FIG. 3 is a flowchart showing a cranking torque control process in a second embodiment.

In FIG. 3, if it is judged that the inter-voltage of the battery 21 is greater than or equal to the lower limit voltage (the step S103: No), the ECU 22 judges whether or not the fall below the lower limit voltage of the battery 21 is a temporal fall below the lower limit voltage due to a first fire of the engine 11. Specifically, the ECU 22 performs the following judgment processes in steps S201 and S202. Incidentally, the processes in the steps S201 and S202 may be performed not only in the order described in FIG. 3 but also starting from either process.

The ECU 22 judges whether or not the fall below the lower limit voltage of the battery 21 is due to an increase in the number of revolutions of the engine 11 (step S201). If it is judged the fall below the lower limit voltage of the battery 21 is due to the increase in the number of revolutions of the engine 11 (the step S201: Yes), the ECU 22 judges whether or not the engine 11 has the first fire (step S202).

If it is judged that the engine 11 has the first fire (i.e. if results of the judgment processes in the step S201 and the step S202 described above are all "Yes") (the step S202: Yes), the ECU 22 judges that the fall below the lower limit voltage of the battery 21 is the temporal fall below the lower limit voltage due to the first fire of the engine 11. Then, the ECU 22 calculates an output allowable limit Wout_fire in view of an increase in the number of revolutions of the engine 11 (step S203).

Here, one specific example of a method of calculating the output allowable limit Wout_fire will be explained with reference to FIG. 4. FIG. 4 is a conceptual view showing one example of a time variation in the number of revolutions of the engine and the battery voltage.

Figure 4:
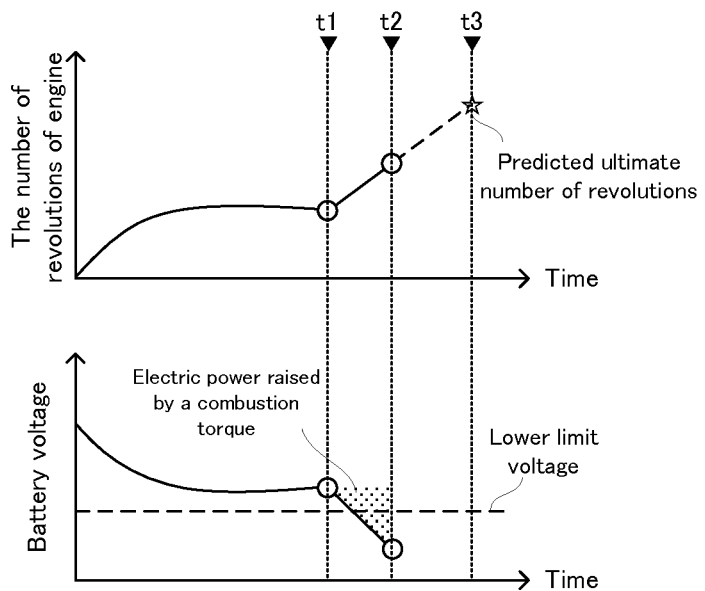
FIG. 4 is a conceptual view showing one example of a time variation in the number of revolutions of an engine and a battery voltage.

In FIG. 4, if the engine 11 has the first fire at a time point t1, the number of revolutions of the engine 11 increases due to the first fire (refer to a time point t2 in an upper part of FIG. 4). At this time, it is assumed that the inter-terminal voltage of the battery 21 falls below the lower limit voltage due to the first fire of the engine 11 (refer to a time point t2 in a lower part of FIG. 4). Incidentally, a hatched portion in a lower part of FIG. 4 indicates an electric power excessively consumed due to the first fire of the engine 11.

The ECU 22 calculates the output allowable limit Wout_fire by subtracting the electric power excessively consumed due to the first fire of the engine 11 from the output electric power Wout calculated in the process in the step S102.

Back in FIG. 3, the ECU 22 calculates the target torque in accordance with the calculated output allowable limit Wout_fire (the step S109). Specifically, for example, the ECU 22 calculates the target torque from the following equation.

Target torque=Output allowable limit $W$out_fire÷(Predicted Ultimate Number of revolutions×Circular constant×2)

Here, the "predicted ultimate number of revolutions" means the number of revolutions of the engine 11 predicted to be achieved in a predetermined time (refer to a time point t3 in the upper part of FIG. 4).

If any of the results of the judgment processes in the step S201 and the step S202 described above is "No" (i.e. if it is judged (i) that the fall below the lower limit voltage of the battery 21 is not due to the increase in the number of revolutions of the engine 11 or (ii) that the engine 11 does not have the first fire), the ECU 22 judges that the fall below the lower limit voltage of the battery 21 is not temporal. Then, the ECU 22 performs the process in the step S110 described above, from the viewpoint of protection of the battery 21.

The present invention is not limited to the aforementioned embodiments, but various changes may be made, if desired, without departing from the essence or spirit of the invention which can be read from the claims and the entire specification. A cranking torque control apparatus, which involves such changes, is also intended to be within the technical scope of the present invention.

DESCRIPTION OF REFERENCE CODES 1 hybrid vehicle
11 engine
14 power distributing mechanism
15 transmission
21 battery
22 ECU
MG1, MG2 motor generator

The invention claimed is:

1. A cranking torque control apparatus mounted on a hybrid vehicle comprising: an engine, a motor coupled with the engine and capable of cranking the engine, and a battery capable of supplying an electric power to the motor, said cranking torque control apparatus comprising:

a setting device capable of setting an output limit value which is a limit value for the electric power outputted from the battery in accordance with an electric power deviation when the motor cranks the engine; and a controlling device for controlling said setting device not to set the output limit value under a condition that a voltage of the battery falls below a lower limit voltage associated with the battery due to resonance of the engine.

2. A cranking torque control apparatus mounted on a hybrid vehicle comprising: an engine, a motor coupled with the engine and capable of cranking the engine, and a battery capable of supplying an electric power to the motor, said cranking torque control apparatus comprising:

a setting device capable of setting an output limit value which is a limit value for the electric power outputted from the battery in accordance with an electric power deviation when the motor cranks the engine; and a controlling device for controlling said setting device not to set the output limit value under a condition that a voltage of the battery falls below a lower limit voltage associated with the battery due to a first fire of the engine.

* * * * *